Jan. 13, 1970   S. U. GATEWOOD   3,489,255
CLUTCH WITH SPRING RETAINERS
Filed March 28, 1968   2 Sheets-Sheet 2

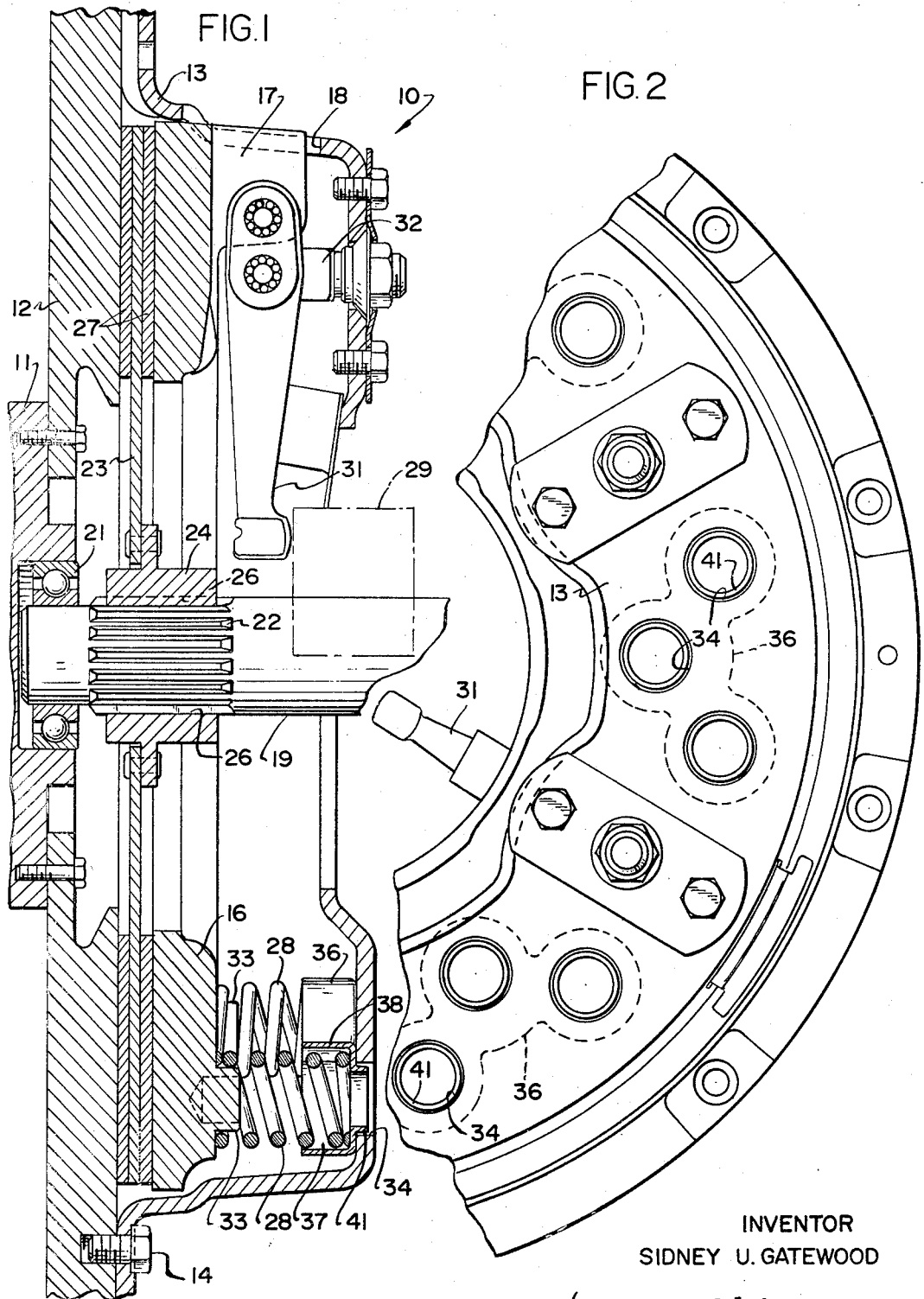

INVENTOR.
SIDNEY U. GATEWOOD

BY Herman E. Smith

ATTORNEY.

United States Patent Office 3,489,255
Patented Jan. 13, 1970

3,489,255
CLUTCH WITH SPRING RETAINERS
Sidney U. Gatewood, Roseville, Mich., assignor to Borg-Warner Corporation, Chicago, Ill., a corporation of Delaware
Filed Mar. 28, 1968, Ser. No. 716,760
Int. Cl. F16d 13/44, 19/00, 21/00
U.S. Cl. 192—89                                   1 Claim

ABSTRACT OF THE DISCLOSURE

A clutch assembly includes spring retainers for limiting lateral distortion of the pressure plate engaging springs, the spring retainers locate groups of engaging springs in prearranged patterns wherein the combined axial compression of a group of springs, mutually acting upon the retainer, assist in opposing the lateral distortion forces imposed upon the springs.

SUMMARY OF THE INVENTION

The present invention relates generally to a friction clutch assembly and more particularly to improved mounting means for the engaging springs thereof.

Among the problems encountered in friction clutches, is the tendency of the engaging springs to undergo lateral distortion under the influence of centrifugal forces. The engaging springs tend to bow outwardly as the clutch assembly undergoes rotation. The bowing of a mid-portion of the spring results in changing the biasing characteristics of the spring and, in addition, may result in tilting the spring holder in relation to the clutch assembly.

It is therefore an object of the present invention to provide a spring retainer for a group of engaging springs which limits lateral distortion of each engaging spring, and employs the bias of the group of springs to mutually assist in providing counter moments of forces for resisting tipping or rocking of the retainer during operation of the clutch assembly.

Other objects and advantages of the invention will become apparent from the following description together with the drawings.

BRIEF DESCRIPTION OF THE DRAWINGS

In the drawings:

FIGURE 1 is an elevation view, in section, of a clutch assembly according to the present invention;

FIGURE 2 is a fragmentary plan view of a portion of the clutch assembly shown in FIG. 1;

DESCRIPTION OF THE PREFERRED EMBODIMENTS

Figure 3:
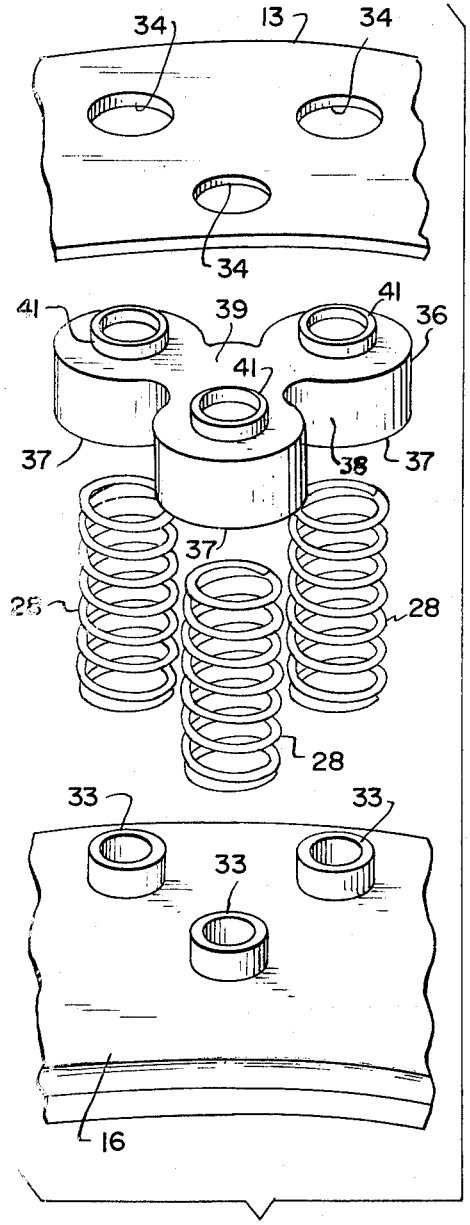
FIGURE 3 is an exploded perspective view of a portion of the clutch assembly showing a preferred form of spring retainer.

Referring now to the drawings, and more particularly to FIGURE 1 thereof, the reference character 10 generally indicates a clutch assembly according to the present invention. A rotary input member 11 is drivingly connected to a flywheel 12, which in turn is secured to the clutch cover plate 13 by cap screws 14. A pressure plate 16 is provided with lugs 17 which are keyed into matching slots 18 in cover plate 13. The flywheel 12, cover plate 13 and pressure plate 16 are thus secured together for rotation as a unit.

A rotary output shaft 19 is journalled in input member 11 by means of bearing assembly 21. A portion of output shaft 19 includes splines 22 forming part of a driving connection therefor.

A friction plate 23 includes a hub portion 24 having splines 26 engageable with output shaft splines 22 to complete the drive connection. The outer portion of friction plate 23 is provided with friction material 27 arranged to be clamped between flywheel 12 and pressure plate 16 upon engagement of the clutch. Clamping of friction plate 23 between pressure plate 16 and flywheel 12 is effected by the engaging springs 28, compressed between pressure plate 16 and a portion of clutch cover plate 13.

Release of the clutch is effected by an axially movable operating means, indicated generaly by the reference character 29 in cooperation with levers 31. The operating means 29 is moved toward the left, as viewed in FIGURE 1, into engagement with the inner ends of levers 31. The levers 31 are pivotally mounted between the ends thereof on mounting studs 32 secured to cover plate 13. The radially outer ends of levers 31 are connected to the lugs 17 of pressure plate 16, for moving pressure plate 16 out of clamping engagement with friction plate 23 upon actuation of operating means 29.

Referring now more particularly to the lower portion of FIGURE 1 and to FIGURE 3 of the drawings, the arrangement and disposition of the engaging springs 28 will be described in greater detail. The springs 28 are preferably arranged in groups of three, forming a triangular configuration, although other suitable configuration can be employed. A triangular configuration of three springs is particularly effective in opposing both radially and tangentially directed lateral forces resulting from rotation of the clutch assembly. Pressure plate 16 is provided with groups of bosses 33 arranged in the patterns desired for locating the groups of engaging springs. Each boss is of a diameter smaller than the internal diameter of an engaging spring, and projects within its associated spring to form a spring seat for one end thereof.

The spring retainers 36 provide spring seats for the other end of the springs and are located within the clutch assembly by means of openings 34 in cover plate 13, the pattern of openings 34 being similar to and alignable with the groups of bosses 33 on pressure plate 16. Each retainer 36 is provided with a plurality of interconnected cup portions 37, here shown as three such portions, merging into each other, defined in part by a single continuous side wall portion 38. The bottom portion of a group of three cups is provided by a single bottom wall 39 such that the three cups are structurally interconnected with each other. Bottom wall 39 is also provided with three ring-like projections 41 extending outwardly therefrom. Each projection 41 is of a diameter smaller than a respective opening 34 and is adapted for insertion therein in order to locate a retainer 36 in its proper position within the clutch assembly.

Side wall portion 38 serves to define the cup portions 37, each of which loosely surrounds one of the engaging springs 28. The side wall 38 thus provides means for limiting lateral deflection of certain of the spring coils located between the ends of the spring. When a spring coil is laterally deflected into engagement with side wall portion 38, a moment of force is created tending to rock or tip the retainer with respect to cover plate 13, however inasmuch as groups of three cups are joined together in a unitary assembly, the moment of force is counteracted by the axial force of the group of springs. The retainer is thus prevented from tipping, permitting the sidewalls of the cup portions to effectively resist lateral deflection of the coils. The retainer 36 thus provides a stable device for limiting lateral deflection of portions of the spring.

Figure 4:
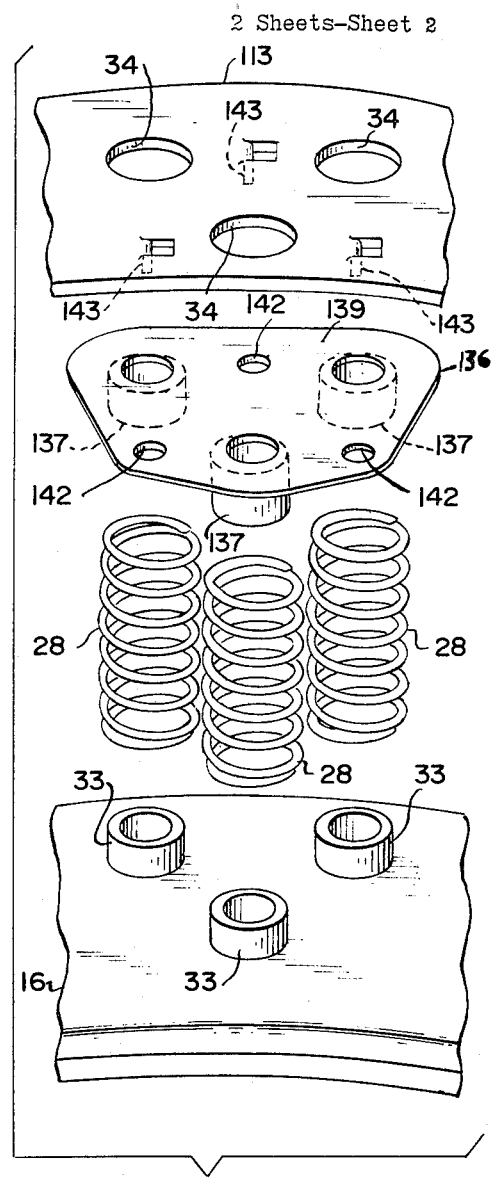
FIGURE 4 is a view similar to FIGURE 3 showing an alternate form of spring retainer.

An alternate form of retainer 136 is illustrated in FIGURE 4. Retainer 136 includes a unitary bottom wall 139 having three tubular projections 137 extending therefrom. Each of the tubular projections 137 is of a diameter slightly smaller than the inner diameter of an engaging spring and is adapted to extend within the spring in order to support the coils thereof against lateral deflection. Bottom wall 139 is provided with the mounting apertures 142 which are engageable with mounting tabs 143 struck from cover plate 113. While mounting apertures 142 and tabs 143 provide a preferred means for mounting the retainer 136 in the clutch assembly, other mounting means may be employed where desired.

Both the retainers 36 and 136 permit the insertion of a drill bit along the center line of the spring where it is desired to balance the assembly by removing material from the pressure plate.

While alternative preferred forms of the invention have been shown and described, it is to be understood that various alternate forms and modifications thereof are included within the spirit of the invention and scope of the following claim.

I claim:
1. In a clutch assembly including, a rotatable flywheel, a cover member including a plurality of apertures secured hereto, a pressure plate disposed within said cover member and arranged for rotation with said flywheel and cover member, a friction plate disposed between said flywheel and pressure plate adapted to be frictionally gripped between said flywheel and pressure plate, and a plurality of coil springs extending between said cover member and pressure plate for urging said pressure plate into gripping engagement with said friction plate; the improvement in retainer means for locating said coil springs in said clutch assembly comprising a unitary retainer member including a bottom wall portion defining a plurality of spring seats for receiving respective of said coil springs and having projecting portions extending therefrom adapted for engagement with said apertures in said cover member securing said unitary member against radial and transverse displacement with respect to said cover member, said unitary member also including a continuous sidewall portion extending outwardly from said bottom wall portion partly enveloping each of said spring seats for limiting lateral deflection of a respective coil spring.

References Cited

FOREIGN PATENTS

| 225,216 | 4/1943 | Switzerland. |
| 830,428 | 3/1960 | Great Britain. |
| 1,303,564 | 8/1962 | France. |

OTHER REFERENCES

Ferodo, Patent of Addition 50,414, March 1940.

BENJAMIN W. WYCHE III, Primary Examiner

U.S. Cl. X.R.

192—70.29; 267—1